Figure 1:
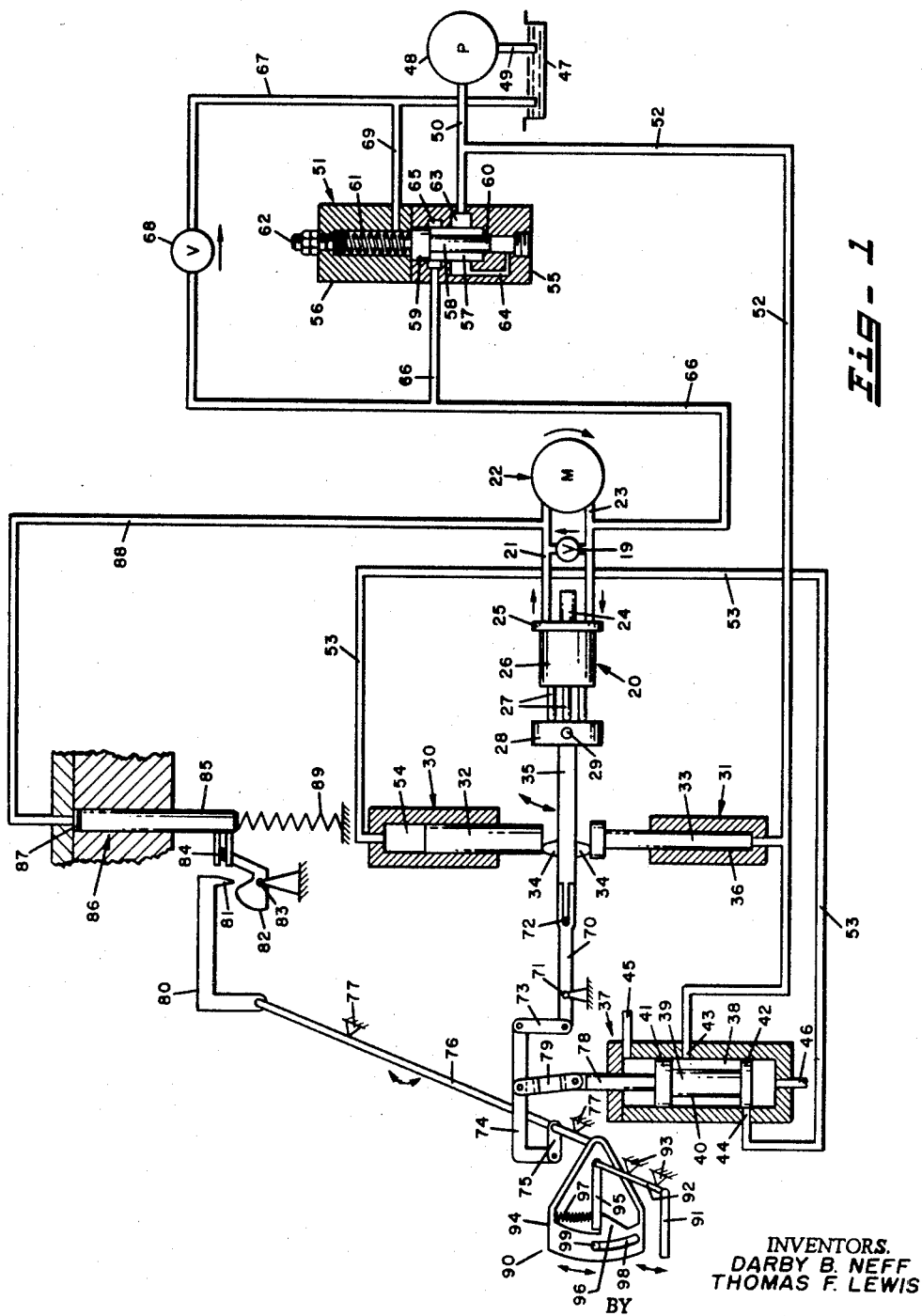

April 19, 1960     D. B. NEFF ET AL     2,932,948
HORSEPOWER LIMITING DEVICE
Filed March 19, 1959     2 Sheets-Sheet 1

INVENTORS.
DARBY B. NEFF
THOMAS F. LEWIS
BY
Donald J. Detrich

April 19, 1960

D. B. NEFF ET AL 2,932,948

HORSEPOWER LIMITING DEVICE

Filed March 19, 1959

2 Sheets-Sheet 2

INVENTORS.
DARBY B. NEFF
THOMAS F. LEWIS
BY
Donald J. Petrich

United States Patent Office 2,932,948
Patented Apr. 19, 1960

2,932,948

HORSEPOWER LIMITING DEVICE

Darby B. Neff, Worthington, Ohio, and Thomas F. Lewis, Royal Oak, Mich., assignors to American Brake Shoe Company, New York, N.Y., a corporation of Delaware Application March 19, 1959, Serial No. 800,472

6 Claims. (Cl. 60—52)

This invention relates to control apparatuses and more particularly to apparatuses for controlling or limiting maximum power requirements or characteristics of fluid transmission devices or systems.

The principal object of this invention is to provide an improved apparatus for controlling or limiting the maximum input and/or output horsepower characteristics of a fluid energy translating device which includes means adjustable by an outside or independent force connected through an energy storing device to adjust the maximum volumetric displacement of the fluid energy translating device and which also includes a motor means responsive to the pressure of the fluid passing through the device which operates to cause said energy storing device to store energy and thereby cooperates with the energy storing device to assume control of the adjustment of the volumetric displacement of the device upon an increase in the pressure of said fluid to a predetermined value.

Another and more specific object of the invention is to provide an improved variable volume fluid energy translating device with control apparatus for controlling or limiting its maximum input and/or output horsepower characteristics in which there is a motor means for adjusting the volume varying means of the translating device which motor means is controlled by a linkage means connected to be operated by the volume varying means of the translating device, a motor which is responsive to the operating pressure of the fluid in the translating device, and a control element operated by an independent force and connected to said linkage through an energy storing device, the operation of said control apparatus being such that the control element may be positioned to demand that the adjusting motor adjust the volume varying means to a maximum volume position and said pressure operated motor, upon a rise in the pressure of said fluid to a predetermined value, will cause said energy storing device to store energy and thereby cooperate with said pressure operated motor in assuming control of said adjusting motor and consequently the position of the volume varying means to adjust the volumetric displacement of the fluid energy translating device to prevent an increase in said pressure above said predetermined value.

Still another object of the invention is to provide means for limiting the horsepower required to drive a variable volume hydraulic pump to a predetermined value by limiting the output pressure of the pump, said limiting means including a control element movable by an independent force and operating through an energy storing device to position the volume varying means of the pump for a predetermined maximum volumetric output of the pump and a motor means operating at a predetermined output pressure of the pump to oppose said energy storing device thereby to assume control of the volume varying means and to position it to adjust the volumetric displacement of the pump to prevent said pressure from exceeding said predetermined pressure.

Further objects and advantages of the present invention will be apparent from the following description, reference being had to the accompanying drawings wherein a preferred form of embodiment of the invention is clearly shown.

Figure 2:
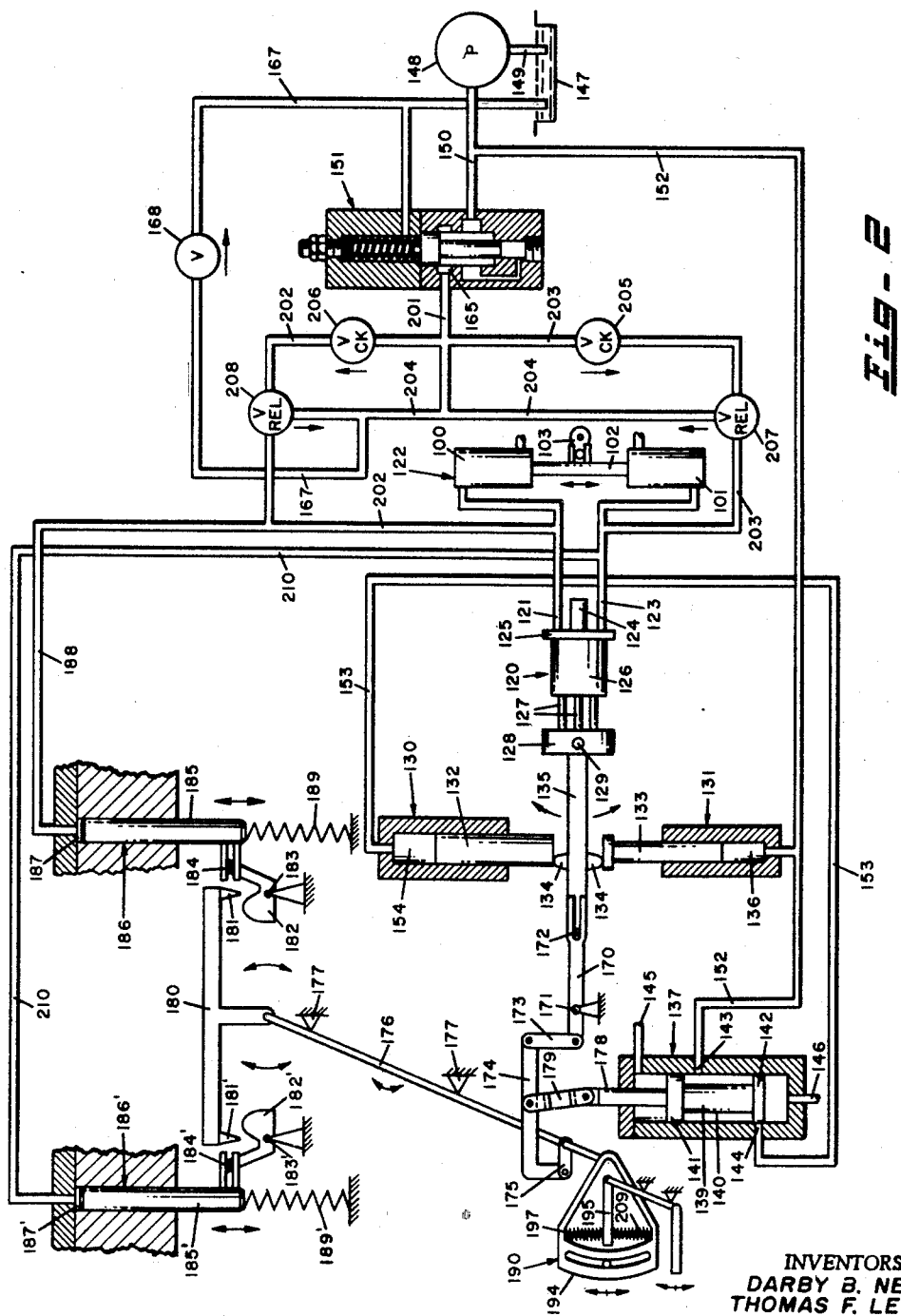

In the accompanying drawings:

Fig. 1 is a diagrammatic view of a fluid power transmission system in which the control or horsepower limiting means of this invention is applied to a non-reversible variable volume pump, and Fig. 2 is a diagrammatic view of a different fluid power transmission system in which the control or horsepower limiting means of the invention is applied to an over center or reversible output port type hydraulic pump.

Referring first to the fluid power transmission system shown in Fig. 1 of the drawings, this system includes a fluid pump 20 the output or pressure port of which is connected through a conduit 21 to the inlet or pressure port of a fluid motor 22 which, in turn, has its outlet or exhaust port connected with the intake or suction port of the pump 20 by a conduit 23. A check valve 19 is connected to permit fluid to flow from the conduit 23 to the conduit 21.

The above described elements are connected to form what is known in the art as a closed circuit, that is, a circuit in which fluid is supplied to a motor by a pump and fluid is returned directly to the pump from the motor. The check valve 19 functions to prevent cavitation in conduit 21 in the event that the motor 22 should be overdriven and begins to function as a pump. While the present system may contain either a gaseous or a liquid fluid, for the purposes of this description it and all of its fluid operated or control devices will be described as hydraulic devices and the system will be considered as being filled with hydraulic fluid.

The motor 22 may be employed as a prime mover for driving any machine and in the system shown its shaft will always be driven in the same direction and its output horsepower can be controlled or limited to any predetermined value since the pressure of the hydraulic fluid which drives it can be controlled or limited in such manner that its maximum pressure will not exceed predetermined values by the horsepower limiting means which is described hereinafter.

The pump 20 is a variable volume axial piston type pump the volumetric capacity or displacement of which may be adjusted or varied between zero and its maximum capacity, and it is a standard pump of this type which includes a shaft 24 which is driven in one direction by a prime mover such as an electric motor, not shown. The pump also includes the usual fixed port plate 25, a cylinder barrel 26 bearing thereagainst which is driven by the shaft 24 and a plurality of pistons 27 which reciprocate in cylinder bores in the cylinder barrel 26. The ends of the pistons 27 bear upon a swash plate 28 which is pivotally mounted to swing upon a pair of trunnions, one of which is seen at 29. When the swash plate 28 is rotated in a clockwise direction from the position in which it is shown in Fig. 1, the swash plate causes the pistons 27 to reciprocate in their cylinders and pump hydraulic fluid and the position or angle of tilt of the swash plate determines the volumetric capacity or displacement of the pump. It is to be understood that while the pump 20 herein described is a variable volume axial piston type pump, a variable volume pump of any other type may be substituted for it.

The position of the swash plate 28 of pump 20 is adjusted by a fluid motor means which includes two opposed cylinder and piston type hydraulic motors 30 and 31 the respective pistons 32 and 33 of which bear against cams 34 on opposite sides of an extension or arm 35 of the swash plate. It is to be noted that the area of the piston 32 of motor 30 which is exposed to hydraulic fluid is greater than that of the piston 33 of motor 31 and that for this reason when hydraulic fluid at the same pressure is applied simultaneously to both pistons 32 and 33 the force exerted by piston 32 will be greater than the force exerted by piston 33 and piston 32 will move the swash plate 28 to its neutral or zero displacement position seen in Fig. 1 of the drawings by overcoming and bottoming the piston 33 in its cylinder 36.

The above described fluid motor means which positions the volume varying means or swash plate 28 of pump 20 is under the control of a valve 37 which includes a body or housing which forms a cylinder 38 in which there is a slidable core 39 which is grooved circumferentially at 40 to provide a pair of spaced lands 41 and 42. The cylinder 38 also includes a fluid pressure inlet port 43 which is located so as to be in constant communication with the groove 40 in core 39 and a port 44 which is controlled by the land 42. It may be mentioned here that the diameter of the port 44 is preferably only slightly less than the thickness of the land 42 in order that a very small amount of axial movement of the core 39 in either direction will open the port 44 to one side or the other of the land 42. It will be seen that the core 39 is hydraulically balanced because the areas of the lands 41 and 42 at each side of the groove 40 are equal and they are exposed to the same pressure and because the opposite ends of the core are connected to drain lines 45 and 46 which may be connected to a fluid reservoir or tank 47.

Hydraulic pressure for operating the motor means including the motors 30 and 31 is derived from a small hydraulic pump 48 which may be driven by the motor which drives pump 20 or from a separate source of power, not shown. Pump 48 receives fluid from the tank or reservoir 47 through a suction line 49 and it discharges this fluid under pressure into a conduit 50 which is connected to a sequence valve 51, which will be more fully described hereinafter, and to a conduit 52 which leads to the port 43 in valve 37 and to the cylinder 36 of the motor 31. The port 44 of valve 37 is connected through a conduit 53 to the cylinder 54 of motor 30.

When the system is operating, fluid pressure from the pump 48 is directed through the conduit 52 to the cylinder 36 of motor 31 and through the port 43 in valve 37 to the groove 40 in core 39, but when the core is in the position shown the port 44 is closed or blocked by the land 42 and the fluid in the cylinder 54 of motor 30 is trapped so that the piston 32 cannot be moved inwardly in its cylinder 54 to permit the piston 33 of motor 31 to swing the swash plate to increase the volumetric capacity or displacement of the pump 20. When the core 39 of valve 37 is moved upwardly to connect the port 44 with drain 46, the cylinder 54 will be connected to drain and the fluid pressure in cylinder 36 will move the piston 33 upwardly to cause the swash plate 28 to move to increase the volumetric capacity or displacement of the pump 20. When the core 39 is moved downwardly to close the port 44 the swash plate will be held in an adjusted position and when the core 39 is moved downwardly sufficiently to cause the land 42 to connect the port 44 with the groove 40, then the pressure of the pump 48 will be directed to both motors 30 and 31 and the swash plate 28 will be moved toward its zero displacement position.

As mentioned previously, fluid from the pump 48 flows through the conduit 50 to the sequence valve 51 and this valve functions to assure that there will always be adequate pressure in the conduits 50 and 52 to operate the motor means 30, 31. The sequence valve 51 is of standard construction and is herein shown as comprising a body 55 and a cap 56. The body 55 includes a stepped bore 57 in which there is a stepped core 58 which includes a head portion or land 59 and a piston or stem 60. The cap 56 includes a bore which is aligned axially with the stepped bore 57 and contains a spring 61 which abuts the head 59 of core 58 and a movable abutment which is adjusted by a screw 62 to adjust the compression of the spring. The conduit 50 enters the body 55 through a port 63 which is in constant communication with a passageway 64 which leads to the end of the small diameter portion of bore 57 and to the end of piston 60. An outlet port 65 in the body 55 which is opened and closed, i.e. connected and disconnected with the port 63 by the head or land 59 of the core 58 is connected to the conduit 23 by a conduit 66 and conduit 66 is connected to the tank or reservoir 47 through a conduit 67 which includes a supercharge pressure control valve 68 which, in practice, may be a spring loaded check valve. A drain line 69 connects the bore in cap 56 with conduit 67.

It will be seen that the sequence valve 51 will not open its port 65 until the pressure in conduit 50 is sufficient to move the core 58 and overcome the spring 61 and that the fluid which then passes through the port 65 may flow through the conduit 66 to the conduit 23 of the previously described closed pump-motor circuit to maintain the latter filled with oil and that the oil which can not be accepted by the closed circuit will pass from the conduit 66 through the conduit 67 and relief valve 68 to the tank 47.

The control valve 37 is operated through mechanism which includes a linkage system herein shown as being comprised of a lever 70 mounted for pivotal swinging movement upon a fixed pivot 71. One end of this lever 70 is bifurcated to form a slot through which it is connected by a pin 72 to the end of the arm 35 of swash plate 28 and the other end of the lever 70 is pivotally connected to one end of a link 73 which connects it to one end of an L-shaped bar 74. The other end of bar 74 is pivotally connected to an arm 75 which is rigidly attached to a rotatable rod 76 mounted on spaced fixed bearings which are indicated at 77. The operating stem 78 of core 39 of valve 37 is connected through a link 79 to the bar 74 approximately at the center of the latter. One end of the rod 76 is rigidly connected to an arm 80 which is provided with an abutment 81 which is engaged by a cam 82 mounted for rotational movement on a fixed pivot 83 and connected through a pin 84 with a slotted appendage of a piston 85 of a hydraulic motor 86. Motor 86 includes a cylinder 87 in which the piston 85 reciprocates which is connected by conduit 88 to the pressure conduit 21 of the closed circuit which includes pump 20 and motor 22. A compression spring 89 abuts the end of piston 85 and operates to force the latter inwardly in its cylinder and against the fluid therein.

The other end of rod 76 is connected through an energy storing device 90 to a control lever or volume demand control means 91 which is rigidly attached to a rod 92 carried for rotary adjustment in spaced bearings 93. The energy storing device 90 includes a hollow frame 94 which is rigidly attached to the rod 76 and it contains a lever or bar 95 which is carried and rotated by the rod 92. The frame 94 is provided with a stop abutment 96 for the lever or bar 95 and the lever or bar 95 and this stop abutment are urged toward each other by a compression spring 97 which is interposed between the frame 94 and lever or bar 95. The frame 94 is provided with an arcuate slot 98 in which there extends a fixed stop in the form of a pin 99. The slot 98 and pin 99 function to determine the limits of the angle through which the frame 94 may be rotated.

The operation of the system of Fig. 1 will be described beginning with the elements thereof in the positions shown and with the motor or motors, as the case may be, which drive the pumps 20 and 48 operating. When the parts of the system are in the positions shown, the working face of swash plate 28 is held in a plane which is at right angles to the axes of the cylinder barrel 26 and pistons 27, the output volume or volumetric displacement of the pump 20 is at minimum or zero, and the motor 22 is not running. The swash plate is held in this neutral or zero position by the motor 30 because fluid which is trapped in its cylinder 54 and the conduit 53 by the valve 37 prevents the operation of the motor 31. It will be seen that under these conditions substantially the entire volumetric output of pump 48 will flow to tank 47 by way of conduit 50, sequence valve 51, conduit 66 and conduit 67 including the supercharge pressure control valve 68.

Assuming now that it is desired to cause the motor 22 to be started and accelerated slowly to some predetermined rate of operation and during its acceleration and operation it will be required to deliver only a very small amount of horsepower the magnitude of which is insufficient to increase the output pressure of pump 20 (or input pressure for motor 22) whereby motor 86 will remain inoperative. Under these conditions the lever 91 will be rotated clockwise from the position shown by an independent or outside force, for example manually, and as the lever 91 is rotated it rotates rod 92 and arm 95 clockwise. Arm 95, acting through the spring 97, rotates the frame 94 which, in turn, rotates the rod 76, arm 75 and arm 80 and moves the abutment 81 toward the cam 82. Because, under the assumed conditions, the motor 86 remains inoperative, the cam 82, abutment 81 and arm 80 have no function at this time. As the arm 75 swings upwardly it lifts the end of the L-shaped bar 74 which is attached thereto causing the bar 74 to pivot at its opposite end and to lift the valve core 39 whereby its land 42 uncovers the port 44 to vent the cylinder 54 of motor 30 thus permitting the pressure in cylinder 36 of motor 31 to force the piston 33, arm 35 and piston 32 upwardly to swing the swash plate 28 from its neutral or central position to cause the pump 20 to pump fluid through the conduit 21 to motor 22. As the end of arm 35 and pin 72 which is carried thereby swing upwardly the lever 70 is rotated upon its pivot 71 to draw the link 73 and the end of the L-shaped bar 74 which is attached thereto downwardly to lower the core 39 thus causing the land 42 thereof to close the port 44 thereby again trapping fluid in the motor 30 and preventing its further operation.

It will be readily understood by those skilled in the art that under the assumed conditions the motions of the arm 35 and its pin 72 will follow closely the motions of the lever 91 and, in fact, so closely that movement of the lever 91 results substantially in immediate adjustment of the position of the swash plate 28. It will also be seen that when the swash plate 28 is to be moved toward the position shown in the drawing that the above described operation of the linkage mechanism and valve 37 will be reversed and that the motor 30 will, when port 44 is connected to conduit 52 by valve 37, overcome motor 31 to change the position of the swash plate 28.

Assuming now that the motor 22 is to be started and accelerated to some predetermined rate of operation during which its horsepower output is to be limited so as not to exceed the rated horsepower of the pump 20 or the motor which drives it. Under this condition, the lever 91 will be rotated clockwise to operate the linkage in the manner previously described to cause the valve core 39 of valve 37 to be lifted to connect the port 44 to drain conduit 46 and the motor 31 will swing the swash plate from the position shown in the drawing and pump 20 will discharge fluid into the conduit 21. If the load which the motor 22 is required to drive is sufficient to cause the output or discharge pressure of the pump 20 to increase sufficiently to cause motor 86 to operate, then cam 82 will be swung on its pivot 83 by the piston 85 and the cam will engage and lift the abutment 81 thereby rotating the arm 80, rod 76, lever 75 and frame 94 in a counter-clockwise direction to compress the spring 97 of the energy storing device 90. This action of the motor 86, of course, results in its assuming control of the linkage system and valve 37 and thereafter it and the energy storing device 90 will operate the valve 37 to maintain the output or discharge pressure of the pump constant, that is, as the output or discharge pressure of the pump falls due to increased speed of operation of the motor 22 the swash plate 28 will be tilted to increase the volumetric capacity of pump 20 or as the output or discharge pressure of pump 20 increases due to decreased speed of operation of motor 22 the swash plate 28 will be tilted to decrease the volumetric output of the pump 20 thereby to maintain the output pressure of the pump 20 constant. The output pressure of the pump 20 is, of course, directly related to the horsepower required by the pump 20 to develop it and the desired horsepower may be predetermined by the characteristics of the spring 89, that is, if it is desired to increase the maximum horsepower output which the pump 20 and motor 22 can be adjusted to deliver, then a relatively strong spring 89 will be employed and if it is desired to decrease this maximum horsepower then a weaker spring will be employed. Means, not shown, may be provided for adjusting or preloading the spring 89.

From the foregoing description of the operation of the system it will be seen that the system operates to limit the maximum horsepower developed by the motor 22, as well as the pump 20 and consequently the maximum horsepower load that will be applied to the motor which drives the pump 20. It will also be seen that the maximum horsepower can be adjusted by the lever 91 to fall within a range of zero to that maximum which is predetermined by the compression characteristics of the spring 89. In practice all of the elements of the system except the motor 22 and tank 47 may be, and preferably are, contained within or carried by the housing of the pump 20.

The system of Fig. 2 of the drawings is similar, basically, to the system of Fig. 1, but it is a reversible system, that is, it is a system which can drive its motor in reverse directions. The closed circuit of this system includes a pump 120, a pair of conduits 121 and 123 and a motor means 122. Pump 120 is similar in construction to the pump 20 which has been described previously, except that its swash plate 128 may be swung to either side of its central, neutral or zero displacement position in which it is shown to reverse the direction of flow of fluid through the pump and in the closed circuit. The motor means 122 is comprised of two piston and cylinder type motors 100 and 101 the pistons of which are attached to a piston rod 102 which, as shown, is connected to rotate or swung an arm 103 which may be rigidly attached to the rudder post of a ship, for example.

In the operation of the above described closed circuit, when the pump 120 pumps fluid through the conduit 121 to motor 100 the piston of the latter acts to move the piston rod 102 which, in turn, imparts movement to the piston of the motor 101 causing the latter to displace fluid from the motor 101 through the conduit 123 to the pump 120, and, of course, the system operates in a reverse manner when the pump 120 pumps fluid into the conduit 123.

The position of the swash plate 128 of pump 120 is adjusted by a fluid motor means which includes two opposed cylinder and piston type hydraulic motors 130 and 131 which include pistons 132 and 133, respectively. Motors 130 and 131 are identical to the motors 30 and 31 except that the piston 133 of motor 131 is not bottomed in its cylinder 136 when the swash plane 128 is in its center, neutral or zero volume position shown.

The above described fluid motor means 130, 131 functions to position the swash plate 128 in the same manner as the motor means 30, 31 and it is under the control of a valve 137 which is identical to the valve 37. Hydraulic pressure for operating the motors 130 and 131 is derived from a hydraulic pump 148 which receives fluid from a tank or reservoir 147 through a suction line 149 and it discharges this fluid under pressure into a conduit 150 which is connected to a sequence valve 151 which is identical to and has the same function as the sequence valve 51. A conduit 152 leads from the conduit 150 to the port 143 in valve 137 and to the cylinder 136 of motor 131. The port 144 of valve 137 is connected through a conduit 153 to the cylinder 154 of motor 137.

The closed circuit which includes pump 120 and motor means 122 is reversible and when the circuit is operated in one direction pump 120 will discharge fluid into conduit 121 and receive fluid from the conduit 123 and when the circuit is operated in the opposite direction the pump 120 will discharge fluid into the conduit 123 and receive fluid through the conduit 121. Because the closed circuit is to be supercharged by make up fluid from the pump 148 it is necessary that the conduit 121 or 123 which is functioning as the low pressure or suction conduit of the closed circuit be connected to receive fluid from the pump 148 and that the other conduit 121 or 123 which is functioning as the pressure conduit be isolated from the pump 148. To accomplish these ends and also to permit the motor 122 to be overdriven by the load which it drives without causing excessive overdriving of the pump 120 or cavitation in the closed circuit, a system of conduits and valves is provided which includes a conduit 201 which receives fluid from pump 148 through the outlet port 165 of sequence valve 151. Conduit 201 is connected with conduits 202 and 203 which are connected, respectively, with conduits 121 and 123, and with a conduit 204. Conduit 203 includes a check valve 205 and conduit 202 includes a check valve 206. These valves 205 and 206 permit fluid to flow from the pump 148 to the conduits 121 and 123, but not in the reverse directions. Conduit 204 is connected to the conduits 202 and 203 through relief valves 207 and 208 which open to permit fluid to flow into the conduit 204 but not in the reverse directions, and conduit 204 is connected to the tank or reservoir 147 through a conduit 167 which includes a supercharge pressure control valve 168. The valve 168 may be a sequence valve similar to the valve 151 or it may be a simple relief valve which functions to create a supercharge pressure for the closed system by causing a back pressure in the conduit 204 and the conduits connected with the latter.

In the operation of the above described system of conduits and valves, when the conduit 121 is acting as the high pressure conduit of the closed system the conduit 123 thereof is acting as the low pressure or suction conduit and fluid is prevented from flowing from the high pressure conduit 121 through the conduit 202 by the check valve 206 and the output volume from port 165 of sequence valve 151 is divided by being directed through the conduit 203 and check valve 205 to conduit 123 and through the conduits 204, 167 and the supercharge pressure control valve 168 to the tank or reservoir 147.

Valve 207 will function if the motor means 122 is overdriven, that is, if some external force acting upon it drives it in such manner as to cause it to act as a pump and to withdraw fluid from the conduit 121 at a rate greater than that at which fluid is supplied thereto by the pump 120 and to discharge fluid into the conduit 123 at a rate which is in excess of the rate at which fluid can be accepted therefrom by the pump 120. When this condition occurs, check valve 205 closes and the relief valve 207 opens to permit fluid to flow from the conduit 123 through conduit 203, valve 207, conduit 204, conduit 201 and conduit 202 including check valve 206 to conduit 121. Should the closed circuit be operating in the opposite direction i.e., in such direction that its conduit 123 is its pressure conduit and conduit 121 is its low pressure or suction conduit and the motor means 122 be overdriven and increase the pressure in conduit 121, then fluid can flow from conduit 121 through conduit 202, relief valve 208 and conduits 204, 201 and conduit 203 including check valve 205 to conduit 123.

The control valve 137 for the swash plate operating motor means including motors 130 and 131 is operated through a linkage mechanism which is generally similar to and includes many of the elements of the linkage system described in connection with the embodiment of Fig. 1. This system differs fundamentally from that of Fig. 1 in that it is capable of operating the valve 137 to cause the swash plate 128 to be moved to either side of its center or neutral position thereby to reverse the operation of the closed circuit including the pump 120 and motor means 122. These elements of the linkage system which correspond with and function in the same manner as elements previously described in connection with Fig. 1 are assigned the same numerals as in Fig. 1, except that they are prefixed by the numeral 1. The fundamental differences in the construction of this linkage control system and the system of Fig. 1 reside in the fact that the frame 194 of the energy storing device 190 contains two springs 197 and 209 which abut opposite sides of the lever or bar 195 thereof and that the arm 80 is substituted by a T-shaped arm 180, and further in that there is provided in addition to the motor 186, an identical motor 186'. Motor 186 is connected directly to conduit 121 through conduits 188 and 202 and motor 186' is connected directly to conduit 123 through a conduit 210. The piston 185' of motor 186' operates a cam 182' which is identical to the cam 182 operated by the piston 185 of motor 186. Cam 182' engages an abutment 181' on the arm 180 for moving the latter.

The operation of the system seen in Fig. 2 when the conduit 121 thereof is functioning as the pressure conduit of the closed system is exactly the same as that described in connection with Fig. 1 of the drawings, but when the system is operated in such manner that the conduit 123 is the pressure conduit, then motor 186 becomes inactive and motor 186', which responds to the pressure in conduit 123, becomes active and it can operate against the spring 209 of the energy storing device 190 to assume control of the movement and/or position of the swash plate 128.

While the form of embodiment of the present invention as herein disclosed constitutes a preferred form, it is to be understood that other forms might be adopted, all coming within the scope of the claims which follow:

We claim:

1. A horsepower limiting apparatus including means through which liquid passes and the volumetric capacity of which may be varied; means for varying the volumetric capacity of said means; motor means for adjusting said volume varying means; motor control means connected to control the operation of said motor means; a volume demand control means movable to different positions by an independent force; a linkage mechanism; resilient means interconnecting said volume demand control means and said linkage mechanism, said linkage mechanism being connected to said volume varying means and said motor control means and operating the latter, and motor means operated by the pressure of said liquid operating to oppose and overcome said resilient means when said pressure exceeds a predetermined value thereby causing an adjustment of said volume varying means.

2. Apparatus for controlling the maximum pressure of a fluid by controlling the flow rate thereof, said apparatus including an adjustable flow controlling means; motor means for adjusting said flow controlling means; a maximum flow rate adjusting means operated by an independent force; linkage mechanism connected to be operated by said flow controlling means and said maximum flow rate adjusting means; resilient means interconnecting said linkage mechanism and said flow rate adjusting means; means operated by said linkage mechanism controlling the operation of said motor means, and motor means operated by the pressure of said fluid operating to oppose and overcome said resilient means when said pressure rises above a predetermined value thereby causing adjustment of said flow controlling means.

3. Apparatus for limiting the horsepower characteristics of a fluid energy translating device by limiting the maximum pressure of liquid passing therethrough by varying its volume, said apparatus including an adjustable flow controlling means; motor means for adjusting said flow controlling means; a maximum flow rate adjusting means operated by an independent force; linkage mechanism connected to be operated by said flow controlling means and said maximum flow rate adjusting means; resilient means interconnecting said linkage mechanism and said flow rate adjusting means; means operated by said linkage mechanism controlling the operation of said motor means, and motor means operated by the pressure of said fluid operating to oppose and overcome said resilient means when said pressure rises above a predetermined value thereby causing adjustment of said flow controlling means.

4. A hydraulic pump including means for limiting the horsepower required to drive it to a predetermined maximum value, said pump including movable means for adjusting its volumetric output; hydraulic motor means for moving said movable means; resilient means operated by an independent force connected through linkage mechanism to said movable means; a valve connected to control the operation of said hydraulic motor means; means connecting said valve to be operated by said linkage, and hydraulic motor means operated by pressure created by said pump, said hydraulic motor operating to oppose and overcome said resilient means when said pressure rises above a predetermined value.

5. A pump including means for limiting the horsepower required to drive it to a predetermined maximum value, said pump including movable means for adjusting its volumetric output; motor means for moving said movable means; resilient means operated by an independent force connected through linkage mechanism to said movable means; control means connected to control the operation of said motor means; means connecting said control means to be operated by said linkage, and fluid motor means operated by pressure created by said pump, said fluid pressure operated motor means operating to oppose and overcome said resilient means when said pressure rises above a predetermined value.

6. A variable volume hydraulic pump including means for limiting the horsepower required to drive it to a predetermined maximum value, said pump including fluid displacing means and adjusting means for varying the fluid displacing capacity of said fluid displacing means; hydraulically operated motor means for adjusting the position of said adjusting means; valve means controlling the operation of said hydraulically operated motor means; means controlling the operation of said valve means, said means including means movable to different positions by an independent force; a linkage system, an energy storing device between said movable means and said linkage system, said linkage system connecting said valve to be operated by said adjusting means and said energy storing device, and hydraulic motor means responsive to pressure developed by said pump causing said linkage system to store energy.

No references cited.